United States Patent
Akotkar et al.

(10) Patent No.: US 10,747,231 B2
(45) Date of Patent: Aug. 18, 2020

(54) IDENTIFICATION OF AUDIO SIGNALS IN SURROUNDING SOUNDS AND GUIDANCE OF AN AUTONOMOUS VEHICLE IN RESPONSE TO THE SAME

(71) Applicant: Intel Corporation, Santa Clara, CA (US)

(72) Inventors: Sarang Akotkar, Kamataka (IN); Mithil Ramteke, Bangalore (IN); Tobias Bocklet, Munich (DE); Sivasubramanian Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 15/816,835

(22) Filed: Nov. 17, 2017

(65) Prior Publication Data
US 2019/0049989 A1 Feb. 14, 2019

(51) Int. Cl.
*G05D 1/02* (2020.01)
*G10L 25/30* (2013.01)
(Continued)

(52) U.S. Cl.
CPC .......... *G05D 1/0255* (2013.01); *G05D 1/0088* (2013.01); *G05D 1/0246* (2013.01); *G06N 3/084* (2013.01); *G10L 21/038* (2013.01); *G10L 25/30* (2013.01); *G10L 25/51* (2013.01); *H04R 3/005* (2013.01); *G06N 3/0445* (2013.01); *G06N 3/0454* (2013.01); *G10L 25/24* (2013.01);
(Continued)

(58) Field of Classification Search
CPC .. G05D 1/0255; G05D 1/0088; G05D 1/0246; G10L 21/038; G10L 25/30; G10L 25/51; G10L 25/24; H04R 3/005; H04R 1/406; H04R 2420/01; H04R 2499/13; G06N 3/084; G06N 3/0445; G06N 3/0454
USPC ........................................................ 701/28
See application file for complete search history.

(56) References Cited

U.S. PATENT DOCUMENTS

5,950,153 A * 9/1999 Ohmori ................. G10L 21/038
704/217
8,907,195 B1 * 12/2014 Erol ........................ G09B 5/06
84/609
(Continued)

*Primary Examiner* — Paula L Schneider
(74) *Attorney, Agent, or Firm* — Schwabe, Williamson & Wyatt, P.C.

(57) ABSTRACT

Embodiments include apparatuses, systems, and methods for a computer-aided or autonomous driving (CA/AD) system to identify and respond to an audio signal, e.g., an emergency alarm signal. In embodiments, the CA/AD driving system may include a plurality of microphones disposed to capture the audio signal included in surrounding sounds to a semi-autonomous or autonomous (SA/AD) vehicle. In embodiments, an audio analysis unit may receive the audio signal to extract audio features from the audio signal. In embodiments, a neural network such as a Deep Neural Network (DNN) may receive the extracted audio features from the audio analysis unit and to generate a probability score to allow identification of the audio signal. In embodiments, the CA/AD driving system may control driving elements of the SA/AD vehicle to autonomously or semi-autonomously drive the SA/AD vehicle in response to the identification. Other embodiments may also be described and claimed.

25 Claims, 7 Drawing Sheets

(51) Int. Cl.
| | |
|---|---|
| *G10L 25/51* | (2013.01) |
| *G10L 21/038* | (2013.01) |
| *G05D 1/00* | (2006.01) |
| *H04R 3/00* | (2006.01) |
| *G06N 3/08* | (2006.01) |
| *H04R 1/40* | (2006.01) |
| *G10L 25/24* | (2013.01) |
| *G06N 3/04* | (2006.01) |

(52) U.S. Cl.
CPC .......... *H04R 1/406* (2013.01); *H04R 2420/01* (2013.01); *H04R 2499/13* (2013.01)

(56) References Cited

U.S. PATENT DOCUMENTS

| | | | |
|---|---|---|---|
| 2011/0038229 | A1* | 2/2011 | Beaucoup ............ G01S 3/8083 367/119 |
| 2014/0257621 | A1* | 9/2014 | Zych .................. G01C 21/3453 701/25 |
| 2016/0155452 | A1* | 6/2016 | Sharifi ................... H04R 29/00 381/56 |
| 2016/0217367 | A1* | 7/2016 | Moreno ................. G10L 15/16 |
| 2017/0148444 | A1* | 5/2017 | Bocklet .................. G10L 17/22 |
| 2018/0134207 | A1* | 5/2018 | Kentley-Klay ........ B60N 2/002 |
| 2018/0308487 | A1* | 10/2018 | Goel .................. G10L 15/1815 |
| 2018/0330178 | A1* | 11/2018 | el Kaliouby ....... G06K 9/00845 |
| 2019/0027032 | A1* | 1/2019 | Arunachalam ...... G08G 1/0965 |

\* cited by examiner

IDENTIFICATION OF AUDIO SIGNALS IN SURROUNDING SOUNDS AND GUIDANCE OF AN AUTONOMOUS VEHICLE IN RESPONSE TO THE SAME

FIELD

Embodiments of the present invention relate generally to the technical field of audio analysis, and more particularly to detecting emergency vehicles and/or other special vehicles or urgent situations in an environment of a semi-autonomous or autonomous (SA/AD vehicle) based at least in part upon analysis of audio signals that may surround or are proximate to the SA/AD vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Experts predict that approximately 10 million semi-autonomous or autonomous driving (SA/AD) vehicles may be on the roads within the next few years. For SA/AD vehicles, it may be crucial to monitor the environment and to respond, with little or no human input, to a variety of dangerous and unforeseen incidents. One example includes an appropriate response to urgent situations, such as, e.g., an approaching emergency vehicle or other special vehicle emitting an alarm and/or blinking lights.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Note also that "proximate" may mean near, on, over, under, attached, coupled to, nearby, surrounding, partially surrounding, or the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth. Embodiments described herein include a computer-aided or autonomous driving (CA/AD) system to identify and respond to an audio signal that originates outside of or proximate to a semi-autonomous or autonomous driving (SA/AD) vehicle. In embodiments, the audio signal may be included in surrounding sounds through which the SA/AD vehicle may travel. Accordingly, in embodiments, the SA/AD vehicle may include a plurality of microphones that may be disposed to capture the audio signal. An audio analysis unit or module may, in embodiments, receive the audio signal from the plurality of microphones or from an appropriate combination of one or more of the plurality of microphones and divide the audio signal into a plurality of frames (also referred to as "audio analysis frames") to allow for extraction of audio features from one or more of the plurality of frames. In embodiments, a neural network classifier such as a Deep Neural Network (DNN) may be coupled to the audio analysis module to receive the extracted audio features and to generate a probability score for one or more of the plurality of frames to classify the one or more of the plurality of frames to allow identification of the audio signal. In embodiments, the CA/AD driving system may further include a video processing camera coupled to the SA/AD vehicle to capture video in a direction from which an alarm frame associated with the audio signal may be captured. In embodiments, the CA/AD driving system may not only identify an alarm signal associated with an emergency vehicle but may also assist the SA/AD vehicle in responding to the alarm signal. As used herein, the term semi-autonomous driving is synonymous with computer-assisted driving. The term does not mean exactly 50% of the driving functions are automated. The percentage of driving functions automated may be a fraction of a percent to almost 100% for a driving operation, and/or it may temporarily be 100% automated for a fraction of the driving operation.

Figure 1:
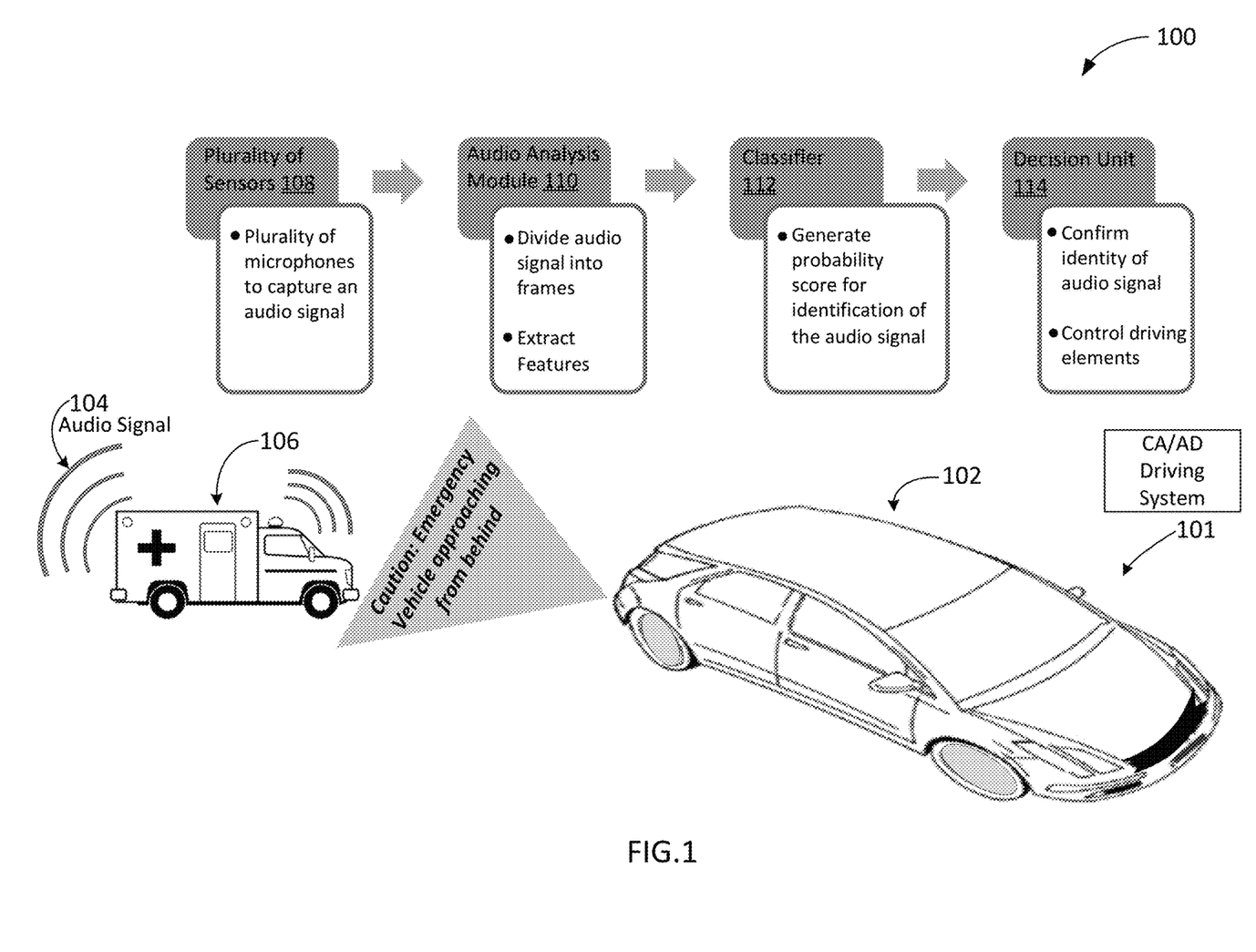
FIG. 1 is a block diagram 100 associated with a computer-aided or autonomous (CA/AD) driving system of a semi-autonomous or autonomous driving (SA/AD) vehicle in accordance with various embodiments.

FIG. 1 is a block diagram 100 associated with a computer-aided or autonomous (CA/AD) driving system 101 according to various embodiments. In embodiments, CA/AD driving system 101 of a semi-autonomous or autonomous driving (SA/AD) vehicle 102 may identify, among other things, an audio signal, e.g., audio signal 104 that may originate from an emergency vehicle 106 outside of or proximate to SA/AD vehicle 102. In embodiments, CA/AD driving system 101 may include a plurality of microphones (shown in FIG. 2) coupled to or otherwise associated with SA/AD vehicle 102 and disposed to capture audio signal 104. In embodiments, SA/AD vehicle 102 may travel through surrounding sounds and audio signal 104 may be included in the surrounding sounds. Note that in various other embodiments, audio signal 104 may be an audio signal originating from sources other than an emergency vehicle, e.g., a message broadcast from another SA/AD or other vehicle to passing or nearby SA/AD vehicles. In embodiments, a plurality of sensors of a first block 108, e.g., a plurality of microphones may be disposed in, on, or around, SA/AD vehicle 102 to capture audio signal 104 in the surrounding sounds. In embodiments, a communication interface may receive from the plurality of microphones, an audio signal included in surrounding sounds proximate to the SA/AD vehicle.

In the embodiment, as shown, CA/AD driving system 101 may further include an audio analysis module at a next block 110 to receive the audio signal from the plurality of microphones or other sources and divide the audio signal into a plurality of frames, e.g., a finite number of data samples of the audio signal, in the embodiment. In embodiments, the audio analysis module of block 110 may then extract audio features from one or more of the plurality of frames. Next, for the embodiment, a classifier at block 112, such as, for example, a neural network such as a Deep Neural Network (DNN), may be coupled to receive the extracted audio features from the audio analysis module. In embodiments, the DNN may generate a probability score for one or more of the plurality of frames to allow identification of audio signal 104. In embodiments, at a block 114, a decision unit may confirm an identity of audio signal 104 and/or subsequently control driving elements of SA/AD vehicle 102 to respond to a situation associated with audio signal 104, e.g. a location of SA/AD vehicle 102.

Figure 2:
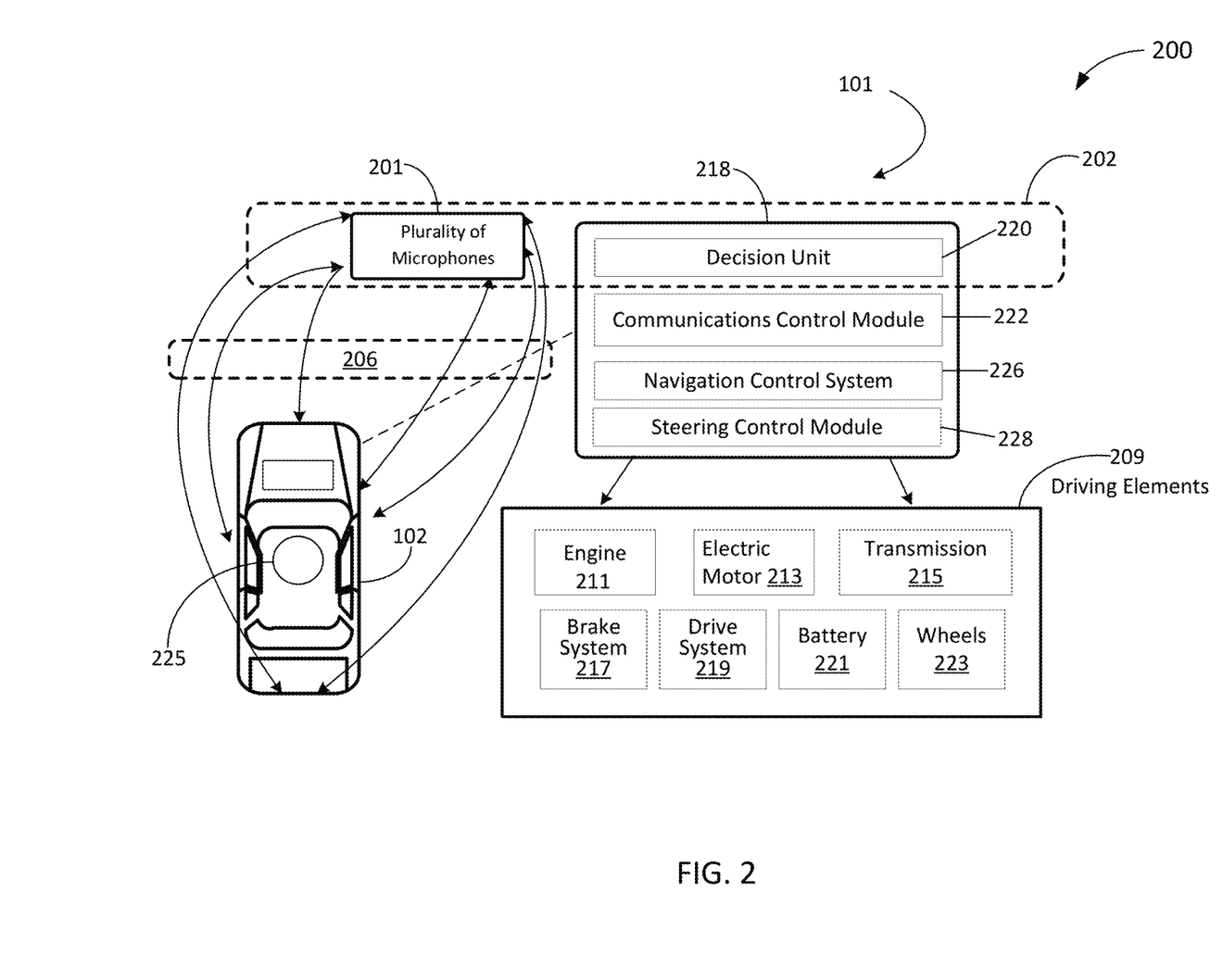
FIG. 2 is a block diagram 200 illustrating the CA/AD driving system of FIG. 1 in accordance with various embodiments.

FIG. 2 is a block diagram 200 further illustrating CA/AD driving system 101 of FIG. 1, in accordance with various embodiments. As briefly described above with respect to the block diagram of FIG. 1, in embodiments, CA/AD driving system 101 of SA/AD vehicle 102 may include a plurality of microphones 201 that may include one or more microphone arrays coupled to a vehicle control system or onboard computer 218. Note for ease of illustration, onboard computer 218 is located in a forward portion of vehicle 102, however, onboard computer 218 may be located in any other suitable location of vehicle 102 in various embodiments. Similarly, in various embodiments, plurality of microphones 201 may be distributed in various locations in, on, or around vehicle 102 to capture audio signals from a substantially 360 scope. In some embodiments, an audio analysis module and a classifier (e.g., audio analysis module of block 110 and classifier of block 112 of FIG. 1) may be integrated with, and/or included in, on, located proximately to, or otherwise disposed with or coupled to one or more of the microphones in plurality of microphones 201 to perform audio analysis on an audio signal, e.g., audio signal 104 received from plurality of microphones 201. Thus, in such embodiments, plurality of microphones 201 may include a local processing unit to perform functions of the audio analysis module and/or classifier on the audio signal. In other embodiments, the audio analysis module and classifier may be included in onboard computer 218 in SA/AD vehicle 102 to receive the audio signal from plurality of microphones 201. In some embodiments, one or more communication interfaces 206 may be configured to receive audio signal 104 from the plurality of microphones 201. Communications interface 206 may be similar to communications interface 510 discussed further with respect to FIG. 5. In embodiments, the one or more communication interfaces 206 may also receive other sensor data such as video camera data, GPS data collected respectively by a camera, or other data that may assist CA/AD driving system identify the audio signal.

In embodiments, CA/AD driving system 101 may further include driving elements 209. Driving elements 209 may include, in embodiments, engine 211, electric motor 213, transmission 215, braking system 217, drive system 219, battery 221, and wheels 223. In embodiments, onboard computer 218 may include a decision unit 220, communications control module 222, navigation control system 226, and a steering control module 228. Note that in some embodiments, as indicated at 202, plurality of microphones 201 may include its own decision unit 220. Thus, in such an embodiments, the plurality of microphones 201 may include a local processing unit to perform functions associated with decision unit 220 and/or the functions of an audio analysis module and a classifier (as noted above). Note that in some embodiments, plurality of microphones 201 may be semi-intelligent and may provide e.g., intermediate classification outputs from the classifier (in connection with FIG. 4) to onboard computer 218. In various embodiments, onboard computer 218 may still include its own decision unit 220. In some embodiments, in addition to functions described below, decision unit 220 may consolidate and process information delivered by one or more of the plurality of microphones 201. In embodiments, CA/AD driving system 101 may include SA/AD vehicle 102. Accordingly, in embodiments, onboard computer 218 may be coupled to autonomously or semi-autonomously drive SA/AD vehicle 102 in response to a direction from decision unit 220. In embodiments, CA/AD driving system 200 may include an output interface (not shown) of onboard computer 218, coupled to send signals to the driving elements 209 to autonomously or semi-autonomously control a navigation of SA/AD vehicle 102 in response to the classification of the one or more frames of a detected audio signal (further discussed with respect to FIG. 4). Note that in some embodiments, one or more of the plurality of microphones 201 may perform beamforming to steer an audio beam in a direction associated with a detected audio signal.

Accordingly, in embodiments, decision unit 220 may be coupled to receive a probability score from the classifier and to implement a low pass filter and a threshold comparison module to determine whether an associated audio signal includes an emergency alarm signal ("alarm signal"). Accordingly, in embodiments where plurality of microphones 201 may be integrated with and/of include decision unit 220, a decision or next action may be determined independently by plurality of microphones 201 and block 218 may then be notified. In embodiments, decision unit 220 may also assist in determining a next action for SA/AD vehicle 102 in response to the alarm signal. For example, in some embodiments, decision unit 220 may work with navigation control system 226 as well as information from a cloud (e.g., cloud 705 of FIG. 7) to determine a location from which the alarm signal and thus emergency vehicle may be approaching. For example, in some embodiments, other SA/AD vehicles 102s may provide results of audio analysis of audio signals included in surrounding sounds in their vicinity to SA/AD vehicle 102 directly or via the cloud to assist SA/AD vehicle 102 in identifying audio signals. Similarly, SA/AD vehicle 102 may provide results of its own audio analysis of audio signals included in surrounding sounds in its vicinity directly or via the cloud to other SA/AD vehicles 102s in the area. Accordingly, in embodiments, in addition to the probability score obtained by decision unit 220 from the DNN, decision unit 220 may receive data packets from other CA/AD driving systems 101s included in other SA/AD vehicles 102s (not shown), data packets and/or data streams from the cloud and/or network infrastructure (e.g., core network elements of a cellular communications network, etc.), navigation signaling/data from on-board navigations systems (e.g., global navigation satellite system (GNSS), global positioning system (GPS), etc.), and/or the like.

Furthermore, in embodiments, navigation control system 226 may control a steering control module 228 to assist in controlling particular driving elements 209 to guide SA/AD vehicle 102 in accordance with the above. For example, navigation control system 226 may receive an approximate location of an emergency vehicle and to control steering control module 228 to allow an emergency vehicle associated with the audio signal to pass SA/AD vehicle 102. Accordingly, in embodiments, at least one of a vision-based camera, radar, and light detection and ranging (LIDAR) sensor, such as each may be located at e.g., 225 on SA/AD vehicle 102, may be coupled to navigation control system 226 to assist in guiding SA/AD vehicle 102 to a location in response to an alarm signal. Note that the foregoing technology is presented for exemplary purposes and that any suitable technology that may provide suitable image-capture or sensor data to assist SA/AD vehicle 102 with navigation may be contemplated.

Accordingly, decision unit 220 may further work with navigation control system 226 to determine how and when SA/AD vehicle 102 should respond to the alarm signal, e.g., whether to slow down or pull over to the side of a road or take other action. In some embodiments, decision unit 220 may determine that communications with an emergency vehicle should be initiated. Accordingly, communications control module 222 (components thereof to be further described in connection to FIGS. 5 and 7) may transmit or receive a message to or from an emergency vehicle to coordinate a response by SA/AD vehicle 102 to a location of the emergency vehicle.

Figure 3:
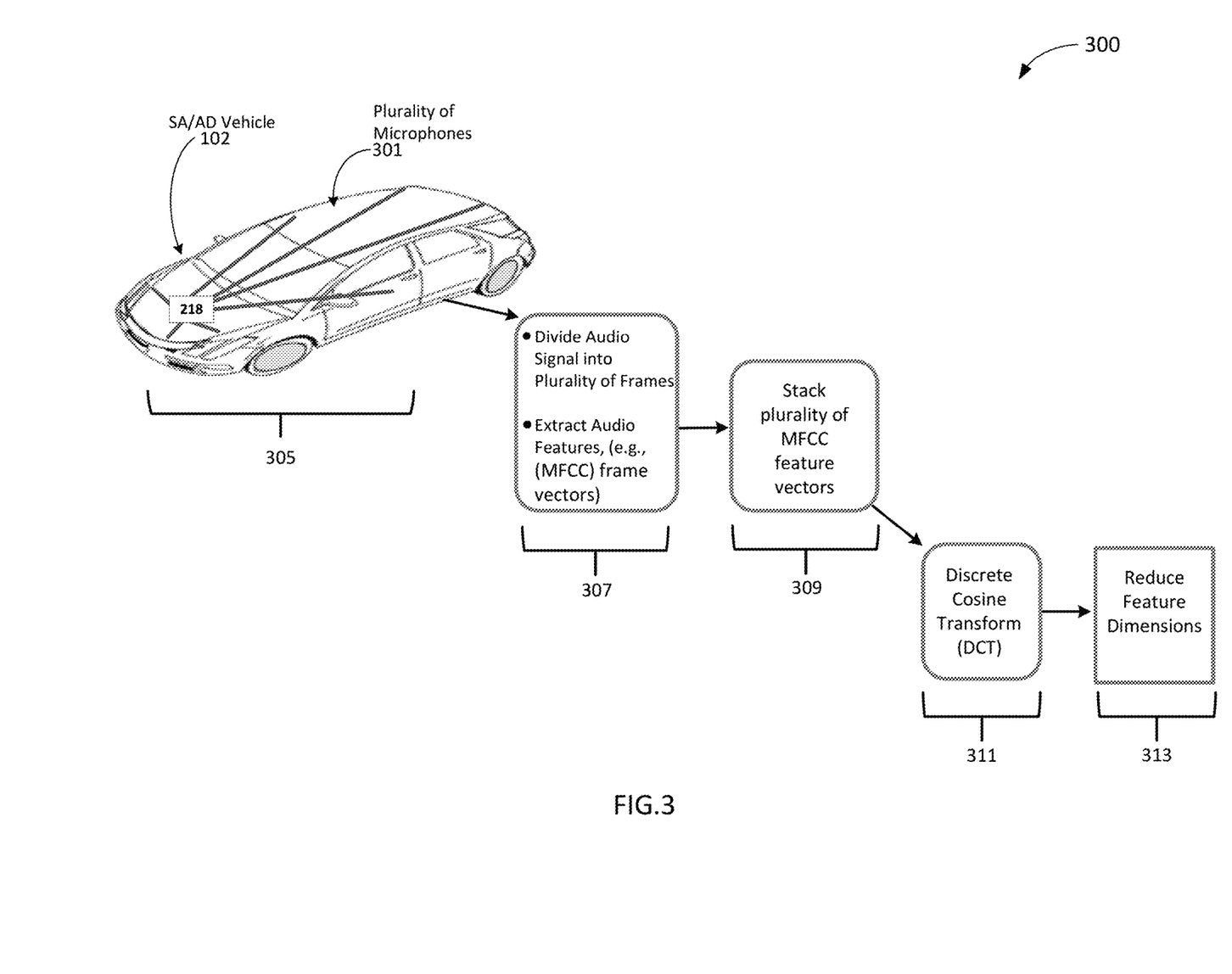
FIG. 3 is a block diagram 300 illustrating in further detail, embodiments associated with the CA/AD driving system of FIGS. 1 and 2.

Next, FIG. 3 is a block diagram 300 illustrating in further detail, embodiments associated with the CA/AD driving system 101 of FIGS. 1 and 2. As shown, in embodiments, at block 305, SA/AD vehicle 102 may include a plurality of microphones 301 including one or more microphones or microphone arrays mounted or disposed in, on, or proximate to an exterior of SA/AD vehicle 102. In embodiments, plurality of microphones 301 may be disposed to capture audio signals in surrounding sounds to SA/AD vehicle 102. For example, as shown in FIG. 3, in embodiments, plurality of microphones 301 may include one or more microphones mounted or disposed in, on, or proximate to a rear of SA/AD vehicle 102, one or more of microphones mounted or disposed in, on, or proximate to one or more sides of SA/AD vehicle 102, and one or more microphones mounted or disposed in, on, or proximate to a front of SA/AD vehicle 102. In embodiments, plurality of microphones 301 may include microphones disposed in a manner to capture a substantially 360 degree scope of audio signals surrounding SA/AD vehicle 102. Note that while in some embodiments, a substantially 360 degree scope is contemplated; it should be appreciated that in other embodiments selected microphones may be used to obtain a smaller sampling area. For example, in some embodiments, a particular analysis may require less input or more focused input, such as receiving and analyzing sounds relating to a particular region of SA/AD vehicle 102, e.g., a wheel well or other vehicle component.

In some embodiments, an audio analysis module and a neural network classifier (e.g., audio analysis module 110 and classifier 112 of FIG. 1) may be included, integrated with, and/or included in, on, located proximately to, or otherwise disposed with or coupled to one or more of the microphones 301 to perform audio analysis on an audio signal, e.g., audio signal 104 of FIG. 1 received from plurality of microphones 201. In other embodiments, the audio analysis module and neural network classifier may be included in an onboard computer 218 or other computer device embedded or coupled to SA/AD vehicle 102 to receive an audio signal from plurality of microphones 201. Thus, in embodiments, at a block 307, the audio analysis module may receive an audio signal from plurality of microphones 301 and may divide the audio signal into a plurality of frames. In some embodiments, the audio analysis module may divide the audio signal into frames that have a duration of approximately 20-70 milliseconds (ms) with an appropriate step size. In embodiments, the audio analysis module may divide the audio signal via a window function into segments of a fixed-length. In embodiments, the segments may overlap so that a step size may be different from a window size. For example, in some embodiments, a window size may include a range of approximately 20-70 ms with a step size range of approximately 5-20 ms. It should be understood that these ranges are approximate and are provided only for exemplary purposes as the window size and/or step size may vary as appropriate for performance of audio analysis for a particular audio signal.

In embodiments, the audio analysis module may then extract audio features (e.g., Mel Frequency Cepstral Coefficient (MFCC)) audio features from the one or more frames. In embodiments, MFCC audio features may be robust to noise. Accordingly, in embodiments, a plurality of MFCC's, e.g., 13 MFCC's, may be extracted every, e.g., 10 milliseconds (ms), and then further processed by a cepstral mean normalization. In embodiments, a fast Fourier transform (FFT) may transform a hamming or hanning-windowed signal of 10 ms into the frequency domain. It may then be converted into Mel-scale and processed further by a discrete cosign transform (DCT) with an output feature dimension of, e.g., 24, in various embodiments. In embodiments, at a next block 309, the audio analysis module may stack a plurality of MFCC feature vectors for a plurality of frames to a left and to a right of the one or more audio analysis frames to capture time patterns associated with the audio signal. In embodiments, the audio analysis module may stack a number of frames to correspond to a duration an audio signal. For example, in embodiments, MFCC feature vectors associated with, e.g., each of 37 audio frames that occur prior to a current analysis frame and MFCC feature vectors of, e.g., each of 37 audio frames that occur after the current analysis frame may be stacked together for a total of 75 MFCC feature vectors. In embodiments, the audio analysis module may stack the MFCC feature vectors together to compute a dimensional feature vector associated with the one or more audio frames. In the current embodiment, a dimensional feature vector of, for example, 1800 may be computed (75×24).

Accordingly, in embodiments, at a block 311, audio analysis module may further reduce the dimensional vector of 1800 by an additional DCT. For example, in some embodiments, the dimensional vector may be reduced by a frame reduction ratio of 0.16, to result in an output feature dimension of 288. In some embodiments, the additional DCT may reduce a number of output feature dimensions, in order to simplify or reduce computations. It should be understood that each of the numbers provided above are only for exemplary purposes and that any other suitable range of values may be contemplated according to e.g., a duration of the audio signal and/or type of analysis to be applied.

Figure 4:
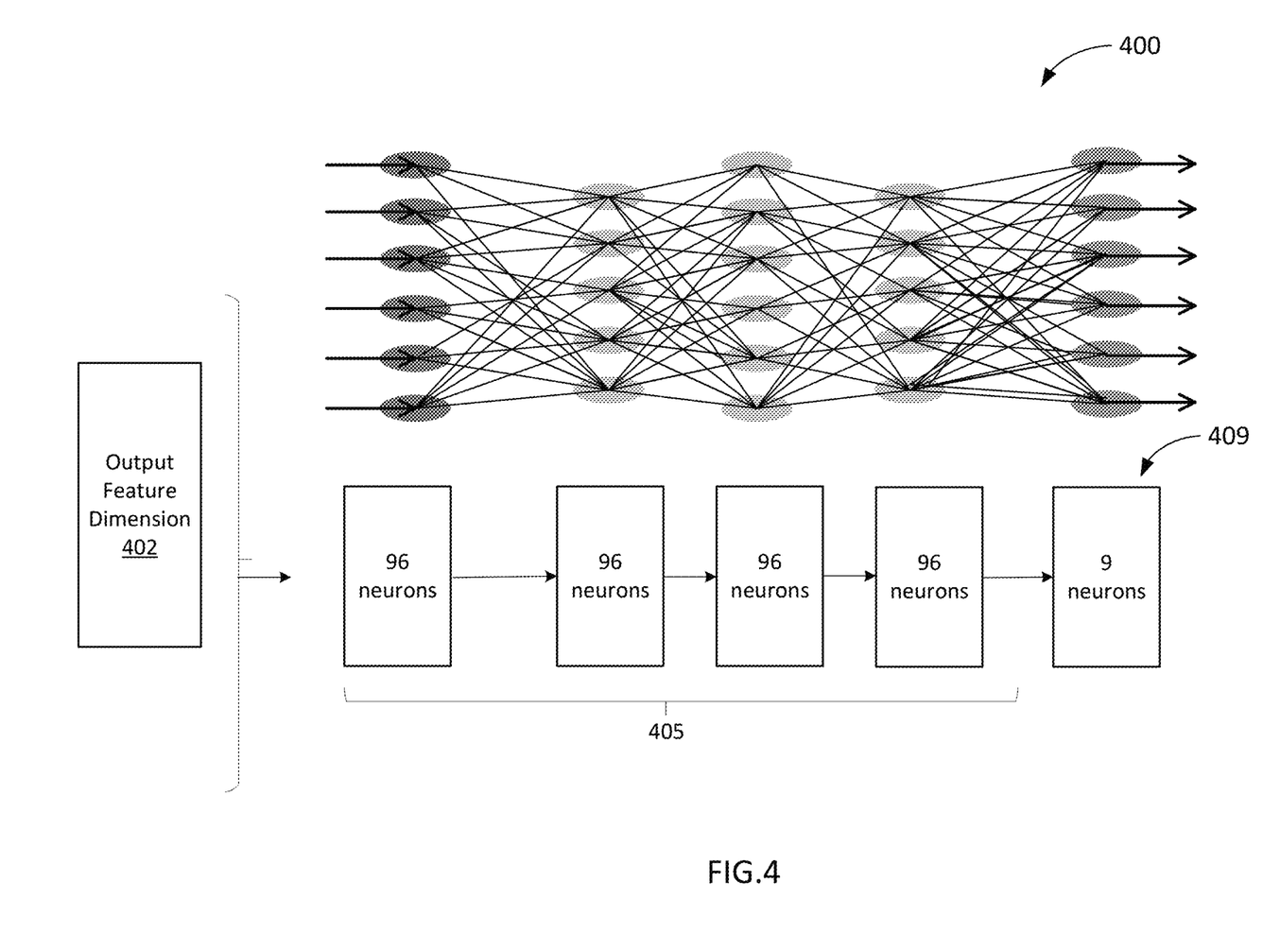
FIG. 4 is a diagram of an example neural network classifier 400 associated with FIGS. 1-3 in accordance with various embodiments.

Next, FIG. 4 is a diagram of an example neural network classifier associated with FIGS. 1-3, in accordance with various embodiments. In embodiments, a neural network classifier 400 may be a Deep Neural Network (DNN) including a plurality of hidden layers 405. In embodiments, at leftward box 402, an output feature dimension of 288 (e.g., in the case of 13 MFCC's extracted every 10 ms and an output feature dimension of 24 in the example of FIG. 3), may be an input to neural network classifier 400. In embodiments, neural network classifier 400 may, as shown, include a plurality of hidden layers 405 that may each include a plurality of neurons such as for example, 96 neurons. As shown in the FIG. 4 embodiment, neural network classifier 400 may include four hidden layers with nine output classes 409. In some embodiments, neural network classifier 400 may be trained using back propagation with a substantial number of positive audio samples (e.g., alarm signals) and negative samples, (e.g., non-alarm signals). Again, as noted similarly in connection with FIG. 3, it should be understood that each of the numbers provided above are only for exemplary purposes and that any other suitable range of values for hidden layers of the DNN, numbers of neurons within each layer, and output classes, may vary.

In embodiments, neural network classifier 400 may comprise a DNN previously trained with a plurality of audio output samples including at least one of alarm sounds, impulsive sounds, animal sounds, household background sounds, baby and child sounds, adult sounds, media sounds including speech, television, radio, and other commonly occurring audio signals. In some embodiments, the DNN may be previously trained with some or more of the aforementioned plurality of audio output samples and/or categories of sounds that may assist the DNN in generating the probability score. Note that in embodiments, although only four hidden layers 405 are shown in FIG. 4, the hidden layers 405 may represent a plurality of hidden layers of varying numbers as well as of varying number of neurons and output classes. As noted in connection with FIG. 1, in embodiments, the DNN may generate a probability score to indicate whether the one or more plurality of frames includes an alarm or non-alarm frame.

Note that in various embodiments, the neural network classifier may extend beyond a feedforward DNN and may include one or more of convolutional neural networks (CNNs), recurrent neural network (RNNs), long short-term memory (LSTM) neural networks, and/or combination of thereof. Note that back propagation is used above for exemplary purposes and that other training may be used. For example, in some embodiments, additional methods and regularizations may be used to efficiently train the neural network classifier. In embodiments, some examples may include weight decay, L1/L2 regularization, mini-batch learning, dropout, and pre-training. In various embodiments, such various additional methods and regularizations may prevent overfitting.

Figure 5:
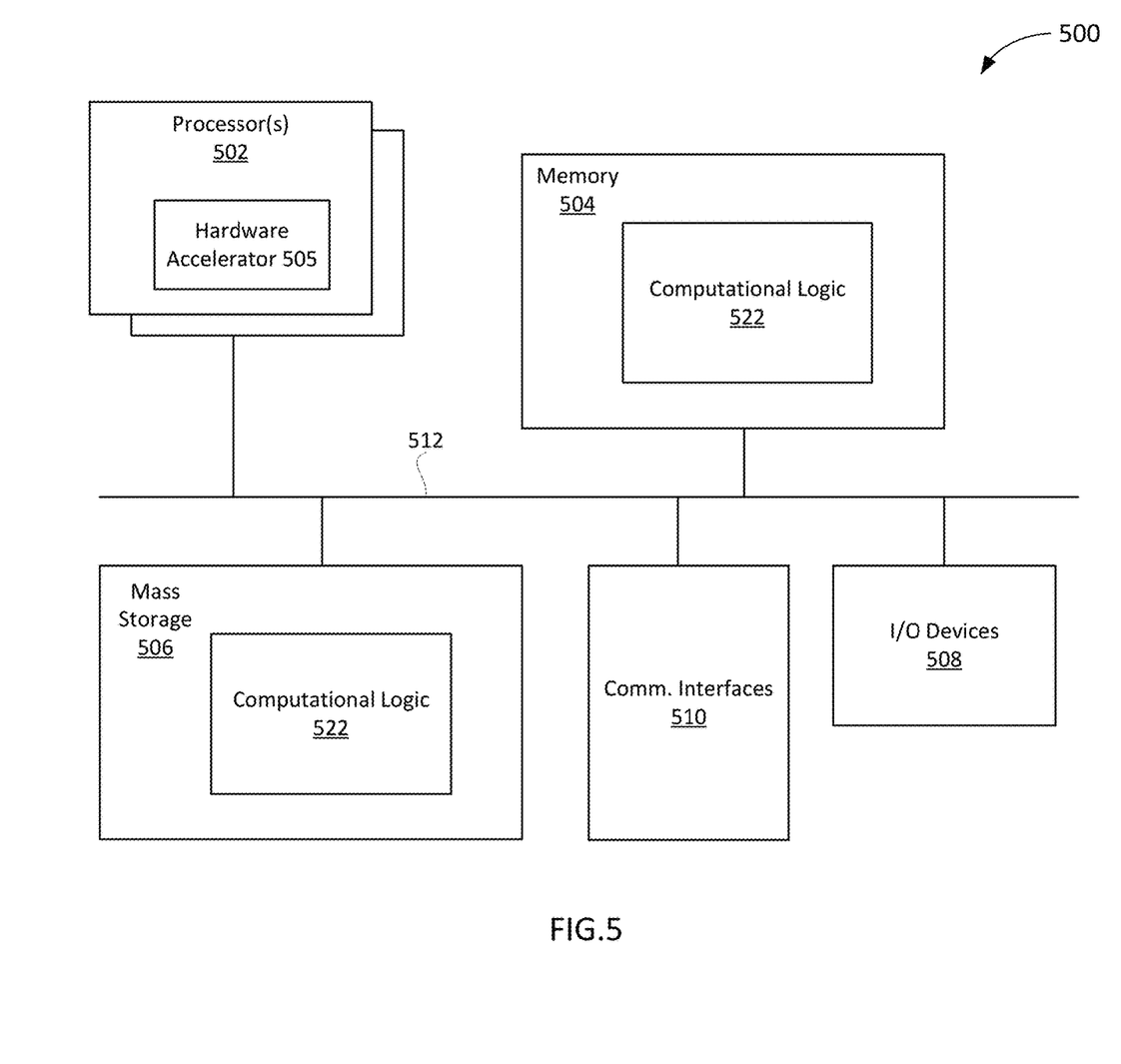
FIG. 5 illustrates an example system 500 in accordance with various embodiments.

FIG. 5 illustrates an example computing device 500 that may be suitable for use to practice selected aspects of the present disclosure. In embodiments, computing device 500 may be included in a CA/AD driving system of SA/AD vehicle as described above with respect to FIGS. 1-4. In embodiments, the CA/AD driving system may be included in a semi-autonomous or autonomous driving (SA/AD) vehicle that travels through surrounding sounds and the CA/AD driving system may include a plurality of microphones disposed to capture an audio signal included in the surrounding sounds. In some embodiments, computing device 500 may include a vehicle control system or onboard computer, e.g. onboard computer 218. In some embodiments, one or more elements of computing device 500 may be included in a plurality of microphones, e.g. plurality of microphones 201 or 301.

In the illustrated embodiment, system 500 may include one or more processors or processor cores 502, and a memory 504. For the purpose of this application, including the claims, the term "processor" refers to a physical processor, and the terms "processor" and "processor cores" may be considered synonymous, unless the context clearly requires otherwise. Additionally, computing device 500 may include mass storage devices 506 (such as diskette, hard drive, compact disc read only memory (CD-ROM) and so forth), communication interfaces 510 (such as network interface cards, modems, infrared receivers, radio receivers (e.g., Bluetooth), and so forth). The elements may be coupled to each other via system bus 512, which may represent one or more buses. In the case of multiple buses, they may be bridged by one or more bus bridges (not shown).

In embodiments, communication interfaces 510 may be included in e.g., communications control module 222 of FIG. 2, and include one or more communications chips and may enable wired and/or wireless communications for the transfer of data to and from the computing device 500. In some embodiments, communication interfaces 510 may include a transceiver including a transmitter and receiver or a communications chip including the transceiver. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 510 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 510 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others.

Each of these elements described above may perform its conventional functions known in the art. In particular, the CA/AD driving system may be employed to store and host execution of programming instructions implementing the operations associated with capturing an audio signal, extracting audio features from one or more audio frames of the audio signal and classifying, by a DNN, based on the extracted audio features, the one or more audio frames as an alarm or non-alarm frame to indicate the presence or absence of an emergency vehicle, as described in connection with FIGS. 1-4. In other embodiments, the CA/AD driving system may be employed to store and host execution of programming instructions implementing the operations associated with determining a response and controlling driving elements of an SA/AD vehicle to autonomously or semi-autonomously drive the SA/AD vehicle in response to an emergency alarm signal as described in connection with FIGS. 1-4.

In embodiments, the aforementioned programming instructions may be collectively referred to as computational logic 522 that provides the capability of the embodiments described in the current disclosure. The various elements may be implemented by assembler instructions supported by processor(s) 502 or high-level languages, such as, for example, C, that can be compiled into such instructions. Operations associated with controlling a power consumption based on power information for an application to be operated on the one or more processors not implemented in software may be implemented in hardware, e.g., via hardware accelerator 505. Aspect of operations associated with controlling drive elements or determining a service provider assignment not implemented in software, as described in connection with FIGS. 1-4, may be implemented in the hardware accelerator.

The number, capability and/or capacity of these elements 502-522 may vary, depending on the number of other devices the computing device 500 is configured to support. Otherwise, the constitutions of elements 502-522 are known, and accordingly will not be further described.

As will be appreciated by one skilled in the art, the present disclosure may be embodied as methods or computer program products. Accordingly, the present disclosure, in addition to being embodied in hardware as earlier described, may take at least partial form of a software embodiment (including firmware, resident software, micro-code, etc.) or an embodiment combining software and hardware aspects that may all generally be referred to as a "circuit," "module," or "system."

Figure 6:
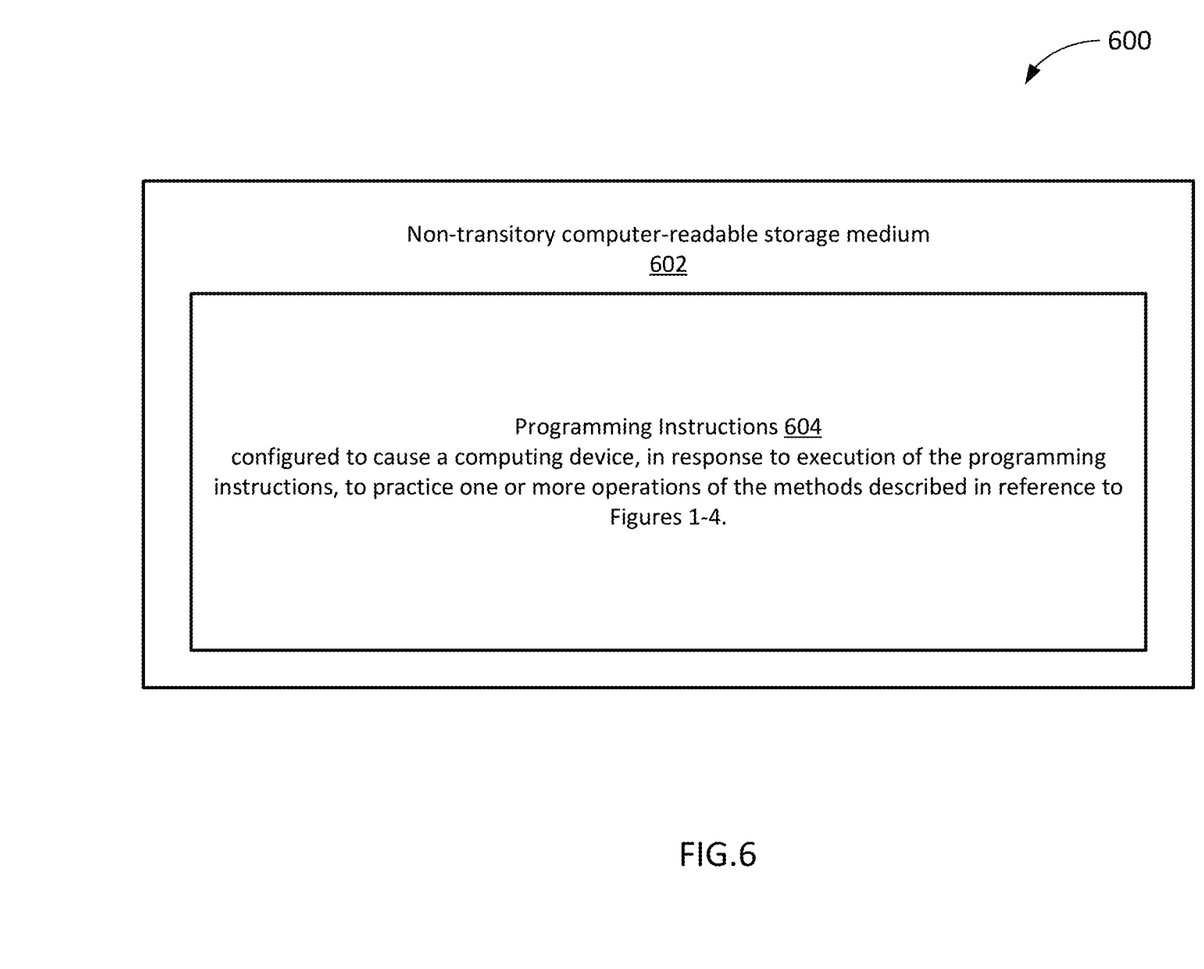
FIG. 6 illustrates a storage medium 600 having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., CA/AD driving system 101, in response to execution of the programming instructions to perform, e.g., various operations as discussed in FIGS. 1-4.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
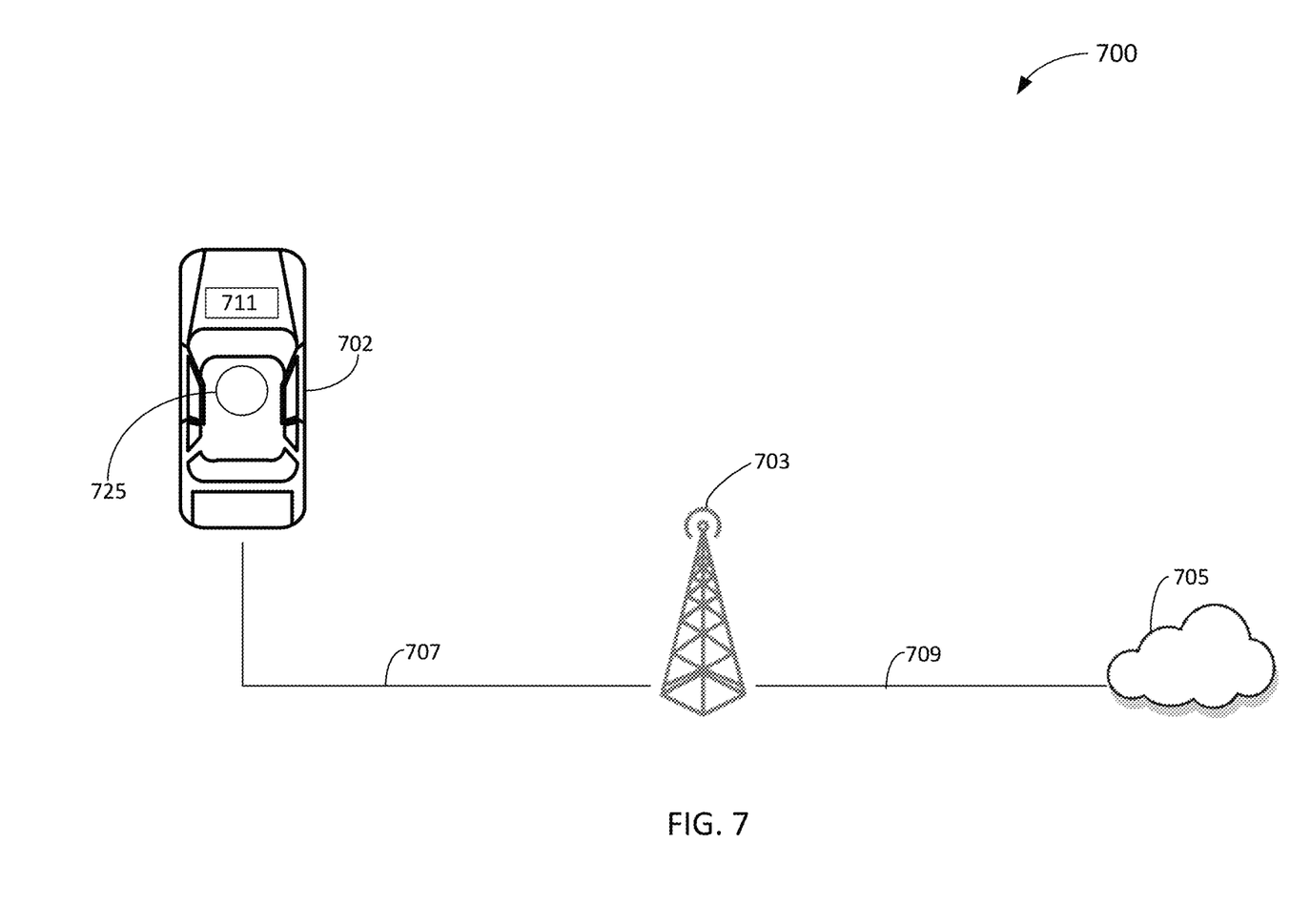
FIG. 7 illustrates an example environment 700 in which various embodiments may be practiced.

FIG. 7 illustrates an environment 700 in which various embodiments described with references to FIGS. 1-6 may be practiced. Environment 700 includes vehicle 702, a wireless access node 703, and cloud computing services/systems 705. In embodiments, vehicle 702 may be an SA/AD vehicle including a CA/AD driving system 711 including driving elements and a plurality of microphones to detect an audio signal and a processing engine coupled to receive the detected audio signal from the plurality of microphones and to extract audio features from the detected audio signal. In embodiments, a DNN may classify the one or more frames of the detected audio signal. In embodiments, the SA/AD vehicle may include an output interface of the onboard computer, coupled to send signals to the driving elements to autonomously or semi-autonomously control a navigation of the SA/AD vehicle in response to the classification of the one or more frames of the detected audio signal.

In some embodiments, CA/AD driving system 711 may determine that communications with an emergency vehicle should be initiated. Accordingly, CA/AD driving system 711 may include a communications control module that may transmit or receive a message to or from an emergency vehicle to coordinate a response by SA/AD vehicle 702 to a location of the emergency vehicle. In embodiments, CA/AD driving system 711 may comprise a vehicle control system to drive elements of the SA/AD vehicle to a location in response to a direction of an emergency alarm signal or determined location of the emergency vehicle. In various embodiments, a decision unit, e.g., decision unit 220, may communicate with cloud 705 for assistance in determining a course of action to respond to an alarm signal.

For illustrative purposes, the following description has been provided illustrating vehicle 702 as a passenger car in a roadway environment. However, the embodiments described herein are also applicable to any type of vehicle, such as trucks, buses, motorcycles, boats or motorboats, and/or any other motorized devices that may benefit from a CA/AD driving system as described in connection with FIGS. 1-6. For example, water vehicles such as boats, speedboats, ferries, barges, hovercrafts, other water vehicles etc., may also benefit from identification of an audio signal in surrounding sounds. The embodiments described herein may also be applicable within the spirit of the described embodiments to flying objects, such as space rockets, aircraft, drones, unmanned aerial vehicles (UAVs), and/or to any other like motorized devices that may benefit from identification of an audio signal that may be included in surrounding sounds proximate to such motorized devices.

The vehicle 702 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 7 shows only a single vehicle 702, vehicle 702 may represent a plurality of individual motor vehicles of varying makes, models, trim, etc., which may be collectively referred to herein as the "vehicle 702."

In embodiments, vehicle 702, may include a CA/AD driving system 711 that may include driving elements coupled to an onboard computer and an output interface of the onboard computer, coupled to send signals to the driving elements to autonomously or semi-autonomously drive the vehicle to the service provider to respond to an alarm signal. In embodiments, the onboard computer may be any type of computer device that is mounted on, built into, or otherwise embedded in a vehicle and is capable of controlling complex command and control functions associated with a semi-autonomous or autonomous vehicle. As noted above, in embodiments, data obtained by the onboard computer may include sensor data from one or more microphones embedded in, on, or around the vehicle 702, data packets from other onboard computers included in other vehicles 702 (not shown), data packets and/or data streams from cloud 705 and/or network infrastructure (e.g., core network elements of a cellular communications network, etc.), navigation signaling/data from on-board navigations systems (e.g., global navigation satellite system (GNSS), global positioning system (GPS), etc.), and/or the like.

For example, as noted in connection with FIG. 2, vehicle 702 may include, for example, a LIDAR sensor 725 (e.g., to locate itself and other objects, in an environment). In embodiments, signals from LIDAR sensor 725 as well as one or more video cameras (not shown) may comprise incoming sensor data to the onboard computer. Note that a LIDAR technology is presented for exemplary purposes and that any suitable technology that may provide suitable image-capture or sensor data to assist vehicle 702 with navigation may be contemplated. In embodiments, high performance sensitive devices, e.g., such as for example but not limited to, central processing units (CPUs), graphic processing units (GPUs), field-programmable gate arrays (FPGAs), may collaborate to analyze the incoming sensor data.

In embodiments, onboard computer of CA/AD system 711 may also include, or operate in conjunction with communications circuitry and/or input/output (I/O) interface circuitry in order to obtain the data for the various sources. The communications circuitry of the vehicle 702 may communicate with the cloud 705 via wireless access node 703. The wireless access node 703 may be one or more hardware computer devices configured to provide wireless communication services to mobile devices (for example, onboard computer in vehicle 702 or some other suitable device) within a coverage area or cell associated with the wireless access node 703. The wireless access node 703 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 707). Furthermore, one or more network interface controllers may be configured to transmit/receive with various network elements (e.g., one or more servers within a core network, etc.) over another backhaul connection (not shown). In embodiments, the onboard computer may generate and transmit data to the wireless access node 703 over link 707, and the wireless access node 703 may provide the data to the cloud 705 over backhaul link 709. Additionally, during operation of the vehicle 702, the wireless access node 703 may obtain data intended for the onboard computer from the cloud 705 over link 709, and may provide that data, e.g., additional data to supplement information about location of an emergency vehicle (or additional information to assist decision unit 220 with determining a next action) to the onboard computer over link 707. The communications circuitry in the vehicle 702 may communicate with the wireless access node 703 in accordance with one or more wireless communications protocols as discussed herein.

As an example, the wireless access node 703 may be a base station associated with a cellular network (e.g., an eNB in an LTE network, a gNB in a new radio access technology (NR) network, a WiMAX base station, etc.), an RSU, a remote radio head, a relay radio device, a small cell base station (e.g., a femtocell, picocell, home evolved nodeB (HeNB), and the like), or other like network element. In embodiments where the wireless access node is a base station, the wireless access node 703 may be deployed outdoors to provide communications for the vehicle 702 when the vehicle 702 is operating at large, for example when deployed on public roads, streets, highways, etc.

In some embodiments, the wireless access node 703 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 703 is a GW, the wireless access node 703 may be deployed in an indoor setting, such as a garage, factory, laboratory or testing facility, and may be used to provide communications for while parked, prior to sale on the open market, or otherwise not operating at large.

In embodiments, the cloud 705 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 705 may be associated with network operator who owns or controls equipment and other elements necessary to provide network-related services, such as one or more base stations or access points (e.g., wireless access node 703), one or more servers for routing digital data or telephone calls (for example, a core network or backbone network), etc. Implementations, components, and protocols used to communicate via such services may be those known in the art and are omitted herein for the sake of brevity.

In some embodiments, the cloud 705 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 705 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 705 and database systems) may coordinate the delivery of data to the onboard computer of vehicle 702. Implementations, components, and protocols used to communicate via such services may be those known in the art and are omitted herein for the sake of brevity.

Some non-limiting Examples are provided below.

Example 1 is a computer-aided or autonomous driving (CA/AD) apparatus to identify an audio signal included in surrounding sounds proximate to a semi-autonomous or autonomous driving (SA/AD) vehicle, the CA/AD driving apparatus, comprising a communication interface to receive from a plurality of microphones coupled to the SA/AD vehicle, the audio signal; an audio analysis unit coupled to receive the audio signal from the communication interface and to divide the audio signal into a plurality of frames; and extract audio features from one or more of the plurality of frames; and a neural network classifier coupled to receive the extracted audio features from the audio analysis unit and to generate a probability score for one or more of the plurality of frames to classify the one or more of the plurality of frames to allow identification of the audio signal.

Example 2 is the CA/AD driving apparatus of Example 1, further comprising the plurality of microphones and to include one or more microphones disposed in, on, around, or proximate to an exterior of the SA/AD vehicle.

Example 3 is the CA/AD driving apparatus of Example 1, wherein the neural network classifier comprises a Deep Neural Network (DNN) previously trained with a plurality of audio output samples including at least one of alarm sounds, impulsive sounds, animal sounds, household background sounds, baby and child sounds, adult sounds, media sounds including speech, television, radio, and the like.

Example 4 is the CA/AD driving apparatus of Example 1, wherein the probability score to indicate whether the one or more plurality of frames includes an alarm or non-alarm frame and wherein the CA/AD driving apparatus further comprises an onboard computer to receive the probability score and to determine whether the audio signal is associated with an emergency vehicle.

Example 5 is the CA/AD driving apparatus of Example 1, wherein the audio analysis unit to extract audio features that comprise a plurality of mel frequency cepstral coefficient (MFCC) frame vectors.

Example 6 is the CA/AD driving apparatus of Example 1, further comprising the plurality of microphones and a local processing unit integrated with, coupled to, or otherwise proximate to the plurality of microphones, wherein the local processing unit to comprise the audio analysis unit and the neural network classifier Example 7 is the CA/AD driving apparatus of Example 1, wherein one or more of the plurality of microphones to perform beamforming to steer an audio beam in a direction associated with the audio signal.

Example 8 is the CA/AD driving apparatus of Example 1, further comprising a video processing camera coupled to the SA/AD vehicle to capture video from a direction from which an alarm frame associated with the audio signal is captured.

Example 9 is the CA/AD driving apparatus of any one of Examples 1-8, wherein the CA/AD driving apparatus comprises the SA/AD vehicle and wherein the driving elements include one or more of an engine, electric motor, braking system, drive system, wheels, transmission, and a battery.

Example 10 is the CA/AD driving apparatus of any one of Examples 1-8, wherein the CA/AD driving apparatus comprises the SA/AD vehicle and further comprises a navigation control module to receive an approximate location of an emergency vehicle and to control a steering module to allow an emergency vehicle associated with the audio signal to pass the SA/AD vehicle.

Example 11 is the CA/AD driving apparatus of any one of Examples 1-8, wherein the CA/AD driving apparatus comprises the SA/AD vehicle and the CA/AD driving apparatus to control driving elements of the SA/AD vehicle to autonomously or semi-autonomously drive the SA/AD vehicle in response to identification of the audio signal.

Example 12 is the CA/AD driving apparatus of any one of Examples 1-8, further comprising at least one of a vision-based camera, radar, and light detection and ranging (LIDAR) sensor coupled to a navigation control module to assist in guiding the SA/AD vehicle to respond to a location of an emergency vehicle associated with the audio signal.

Example 13 is a method to identify an alarm signal to alert a semi-autonomous or autonomous driving (SA/AD) vehicle of a presence of an emergency vehicle, the method comprising capturing, by an array of microphones coupled to the SA/AD vehicle and disposed to capture an audio signal that at least partially surrounds or is proximate to the SA/AD vehicle; providing, by the array of microphones, the audio signal to an analysis unit; receiving, by the analysis unit, the audio signal from the array of microphones; extracting, by the analysis unit, audio features from one or more audio frames of the audio signal and providing the audio features to a neural network; and classifying, by the neural network, based on the extracted audio features, the one or more audio frames as an alarm or non-alarm frame to indicate the presence or absence of an emergency vehicle Example 14 is the method of Example 13, wherein the neural network is a Deep Neural Network (DNN) and wherein classifying, by the DNN, the one or more audio frames as the alarm or non-alarm frame, comprises generating a probability score associated with each of the one or more audio frames.

Example 15 is the method of Example 13, wherein extracting, by the analysis unit, audio features comprises extracting a plurality of mel frequency cepstral coefficient (MFCC) feature vectors from the one or more audio frames.

Example 16 is the method of Example 15, wherein extracting, by the analysis unit, audio features, comprises stacking a plurality of MFCC feature vectors for a plurality of frames to a left and to a right of the one or more audio frames to compute a dimensional feature vector associated with the one or more audio frames.

Example 17 is the method of Example 16, further comprising, performing a discrete cosine transformation (DCT) to reduce a dimensionality of the dimensional feature vector.

Example 18 is one or more non-transitory computer-readable media containing instructions stored thereon to cause a computer-aided or autonomous driving (CA/AD) system, in response to execution of the instructions, to: capture, by a plurality of microphones, an audio signal, wherein the plurality of microphones to be coupled to an SA/AD vehicle and disposed to capture an audio signal included in surrounding sounds of the SA/AD vehicle; provide, by the plurality of microphones, the audio signal to an audio analysis module; extract, by the audio analysis module, audio features from one or more audio frames of the audio signal to indicate a likelihood of a presence of an emergency vehicle in a proximity to the SA/AD vehicle; and control, by the CA/AD driving system, a vehicle control system to semi-autonomously or autonomously drive the SA/AD vehicle to respond to a location of an emergency vehicle when the likelihood of the presence of the emergency vehicle is indicated.

Example 19 is the computer-readable media of Example 18, wherein the instructions to control, by the CA/AD driving system, the vehicle control system to semi-autonomously or autonomously drive the SA/AD vehicle includes instructions to determine, by a navigation control system, navigation of the SA/AD vehicle in response to presence of the emergency vehicle.

Example 20 is the computer-readable media of Example 18, wherein the instructions to extract audio features from one or more audio frames of the audio signal, by the audio analysis module, comprise instructions to extract a plurality of mel frequency cepstral coefficient (MFCC) feature vectors from the one or more audio frames.

Example 21 is the computer-readable media of any one of Examples 18-20, wherein the instructions to extract audio features from the one or more audio frames, by the CA/AD driving system, further include instructions to provide the audio features to a Deep Neural Network (DNN) for classification as an alarm or non-alarm frame.

Example 22 is the computer-readable media of any one of Examples 18-21, wherein the instructions to extract audio features from the one or more audio frames, by the CA/AD driving system, further include instructions to divide the audio signal into frames that have duration of approximately 20-30 milliseconds.

Example 23 is a system, comprising: means for capturing an audio signal included in surrounding sounds of a semi-autonomous or autonomous driving (SA/AD) vehicle, wherein the SA/AD vehicle to travel through the surrounding sounds; and means for extracting audio features from one or more audio frames of the audio signal to indicate a likelihood of a presence of an emergency vehicle in a proximity to the SA/AD vehicle.

Example 24 is the system of Example 23, further comprising means for controlling a vehicle control system to control driving elements of the SA/AD vehicle to respond to presence of an emergency vehicle.

Example 25 is the system of Example 23, wherein the means for capturing the audio signal to include means for performing beamforming to steer an audio beam in a direction associated with the audio signal.

Example 26 is a computer-aided or autonomous driving (CA/AD) system to assist a semi-autonomous or autonomous driving (SA/AD) vehicle to identify an audio signal in surrounding sounds of the SA/AD vehicle, the CA/AD system comprising: driving elements; a plurality of microphones coupled to the driving elements and located proximate to an exterior of the SA/AD vehicle to detect the audio signal; an onboard computer coupled to receive the detected audio signal from the plurality of microphones and to: extract audio features from the detected audio signal; and provide the extracted audio features to a Deep Neural Network (DNN) to allow DNN to classify the one or more frames of the detected audio signal; and an output interface of the onboard computer, coupled to send signals to the driving elements to autonomously or semi-autonomously control a navigation of the SA/AD vehicle in response to the classification of the one or more frames of the detected audio signal.

Example 27 is the CA/AD system of Example 26, wherein the CA/AD system comprises the SA/AD vehicle and the driving elements include one or more of an engine, electric motor, braking system, drive system, wheels, transmission, and a battery.

Example 28 is the CA/AD system of Example 26, wherein the CA/AD system comprises the SA/AD vehicle and further comprises a navigation control module to receive an approximate location of an approaching emergency vehicle and to control a steering module to drive the SA/AD vehicle to allow the approaching emergency vehicle to pass the SA/AD vehicle.

Example 29 is the CA/AD system of Example 26, wherein the onboard computer comprises the DNN and the onboard computer to further provide a probability score associated with a type of sound included in one of at least nine output classes.

Example 30 is the CA/AD system of Example 26, wherein the onboard computer further to implement a low pass filter and a threshold comparison module to determine a type of sound associated with the probability score.

Example 31 is the CA/AD system of any one of Examples 26-30, wherein the CA/AD system comprises the SA/AD vehicle and further comprises a navigation control module to receive an approximate location of an emergency vehicle associated with the detected audio signal and to control the driving elements to allow the emergency vehicle to respond to a location of the emergency vehicle.

Example 32 is the CA/AD system of Example 31, further comprising at least one of a vision-based camera, radar, and light detection and ranging (LIDAR) sensor coupled to the navigation control module to assist in guiding the SA/AD vehicle to a physical location determined in response to an approximate direction of the audio signal.

Example 33 is the CA/AD system of any one of Examples 26-31, wherein the DNN includes a DNN previously trained with a plurality of audio output samples including at least one or more of alarm sounds, impulsive sounds, animal sounds, household background sounds, baby and child sounds, adult sounds, media sounds including speech, television, radio, and the like.

Although certain embodiments have been illustrated and described herein for purposes of description, this application is intended to cover any adaptations or variations of the embodiments discussed herein. Therefore, it is manifestly intended that embodiments described herein be limited only by the claims. Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

As noted previously, the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Although certain embodiments have been illustrated and described herein for purposes of description, this application is intended to cover any adaptations or variations of the embodiments discussed herein. Therefore, it is manifestly intended that embodiments described herein be limited only by the claims. Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A computer-aided or autonomous driving (CA/AD) apparatus to identify an audio signal that originates outside of or proximate to a semi-autonomous or autonomous driving (SA/AD) vehicle and is included in surrounding sounds proximate to the SA/AD vehicle, the CA/AD apparatus comprising:
 a communication interface to receive the audio signal from a plurality of microphones coupled to the SA/AD vehicle;
 at least one memory; and
 at least one processor;
 wherein the at least one memory and the at least one processor are operatively coupled and the processor is to perform operations including to:
  receive the audio signal from the communication interface;
  divide the audio signal into a plurality of frames, wherein each of the plurality of frames has a size that is fixed in length relative to each other and wherein a window size of a window including data to be processed from the plurality of frames is selected from a first range that is different from a second range, and wherein the second range is a step size range from which a size of a step is selected and the step size is a length of time between two successive windows;
  extract audio features from one or more of the plurality of frames; and
  perform neural network classification to generate a probability score for one or more of the plurality of frames to classify the one or more of the plurality of frames to allow identification of the audio signal.

2. The CA/AD apparatus of claim 1, further comprising the plurality of microphones and to include one or more microphones disposed in, on, around, or proximate to an exterior of the SA/AD vehicle.

3. The CA/AD apparatus of claim 1, wherein the at least one processor performs a neural network classification by a Deep Neural Network (DNN) previously trained with a plurality of audio output samples including at least one of alarm sounds, impulsive sounds, animal sounds, household background sounds, baby and child sounds, adult sounds, and media sounds including speech, television, and radio.

4. The CA/AD apparatus of claim 1, wherein the probability score is to indicate whether the one or more plurality of frames includes an alarm or non-alarm frame and wherein the CA/AD apparatus further comprises an onboard computer to receive the probability score and to determine whether the audio signal is associated with an emergency vehicle.

5. The CA/AD apparatus of claim 1, wherein the at least one processor is to extract a plurality of mel frequency cepstral coefficient (MFCC) frame vectors.

6. The CA/AD apparatus of claim 1, further comprising the plurality of microphones and wherein the at least one processor is proximal to the plurality of microphones.

7. The CA/AD apparatus of claim 1, wherein one or more of the plurality of microphones is to perform beamforming to steer an audio beam in a direction associated with the audio signal.

8. The CA/AD apparatus of claim 1, further comprising a video processing camera coupled to the SA/AD vehicle to capture video from a direction from which an alarm frame associated with the audio signal is captured.

9. The CA/AD apparatus of claim 1, wherein the CA/AD apparatus comprises the SA/AD vehicle and wherein driving elements include one or more of an engine, electric motor, braking system, drive system, wheels, transmission, and a battery.

10. The CA/AD apparatus of claim 1, wherein the CA/AD apparatus comprises the SA/AD vehicle and further is to perform operations comprising to receive an approximate location of an emergency vehicle and to control the SA/AD vehicle to allow an emergency vehicle associated with the audio signal to pass the SA/AD vehicle.

11. The CA/AD apparatus of claim 1, wherein the CA/AD apparatus comprises the SA/AD vehicle and is to control driving elements of the SA/AD vehicle to autonomously or semi-autonomously drive the SA/AD vehicle in response to identification of the audio signal.

12. The CA/AD apparatus of claim 1, further comprising at least one of a vision-based camera, radar, and light detection and ranging (LIDAR) sensor to assist in guiding the SA/AD vehicle to respond to a location of an emergency vehicle associated with the audio signal.

13. A method to identify an alarm signal to alert a semi-autonomous or autonomous driving (SA/AD) vehicle of a presence of an emergency vehicle, the method comprising:
 capturing, by an array of microphones coupled to the SA/AD vehicle and disposed to capture, an audio signal that at least partially surrounds or is proximate to the SA/AD vehicle;
 dividing the audio signal into a plurality of frames, wherein each of the plurality of frames has a size that is fixed in length relative to each other and wherein a window size of a window including data to be processed from the plurality of frames is selected from a first range that is different from a second range, and wherein the second range is a step size range from which a size of a step is selected and the step size is a length of time between two successive windows;
 extracting audio features from one or more audio frames of the audio signal and providing the audio features to a neural network; and
 classifying, by the neural network, based on the extracted audio features, the one or more audio frames as an alarm or non-alarm frame to indicate the presence or absence of an emergency vehicle.

14. The method of claim 13, wherein the neural network is a Deep Neural Network (DNN) and wherein classifying, by the DNN, the one or more audio frames as the alarm or non-alarm frame comprises generating a probability score associated with each of the one or more audio frames.

15. The method of claim 13, wherein extracting audio features comprises extracting a plurality of mel frequency cepstral coefficient (MFCC) feature vectors from the one or more audio frames.

16. The method of claim 15, wherein extracting audio features comprises stacking a plurality of MFCC feature vectors for a plurality of frames to a left and to a right of the one or more audio frames to compute a dimensional feature vector associated with the one or more audio frames.

17. The method of claim 16, further comprising performing a discrete cosine transformation (DCT) to reduce a dimensionality of the dimensional feature vector.

18. One or more non-transitory computer-readable media containing instructions stored thereon to cause a computer-aided or autonomous driving (CA/AD) system, in response to execution of the instructions, to:
    capture, by a plurality of microphones, an audio signal, wherein the plurality of microphones is to be coupled to a semi-autonomous or autonomous driving (SA/AD) vehicle and disposed to capture an audio signal included in surrounding sounds of the SA/AD vehicle;
    divide the audio signal into a plurality of frames, wherein each of the plurality of frames has a size that is fixed in length relative to each other and wherein a window size of a window including data to be processed from the plurality of frames is selected from a first range that is different from a second range, and wherein the second range is a step size range from which a size of a step is selected and the step size is a length of time between two successive windows;
    extract audio features from one or more audio frames of the audio signal to indicate a likelihood of a presence of an emergency vehicle in a proximity to the SA/AD vehicle; and
    control, by the CA/AD system, a vehicle control system to semi-autonomously or autonomously drive the SA/AD vehicle to respond to a location of an emergency vehicle to allow the emergency vehicle to pass when the likelihood of the presence of the emergency vehicle is indicated.

19. The computer-readable media of claim 18, wherein the instructions to control the vehicle control system to semi-autonomously or autonomously drive the SA/AD vehicle include instructions to determine, by a navigation control system, navigation of the SA/AD vehicle in response to presence of the emergency vehicle.

20. The computer-readable media of claim 18, wherein the instructions to extract audio features from one or more audio frames of the audio signal comprise instructions to extract a plurality of mel frequency cepstral coefficient (MFCC) feature vectors from the one or more audio frames.

21. The computer-readable media of claim 18, wherein the instructions to extract audio features from the one or more audio frames, by the CA/AD system, further include instructions to provide the audio features to a Deep Neural Network (DNN) for classification as an alarm or non-alarm frame.

22. The computer-readable media of claim 18, wherein the instructions to extract audio features from the one or more audio frames, by the CA/AD system, further include instructions to divide the audio signal into frames that have a duration of approximately 20-30 milliseconds.

23. A system, comprising:
    means for capturing an audio signal included in surrounding sounds of a semi-autonomous or autonomous driving (SA/AD) vehicle, wherein the SA/AD vehicle travels through the surrounding sounds; and
    means for extracting audio features from one or more audio frames of the audio signal to indicate a likelihood of a presence of an emergency vehicle in a proximity to the SA/AD vehicle, wherein the one or more audio frames are included in a plurality of audio frames, each having a size that is fixed in length relative to each other and wherein a window size of a window including data to be processed from the plurality of frames is selected from a first range that is different from a second range from which a size of a step is selected and the step size is a length of time between two successive windows.

24. The system of claim 23, further comprising means for controlling a vehicle control system to control driving elements of the SA/AD vehicle to respond to the likelihood of the presence of the emergency vehicle.

25. The system of claim 23, wherein the means for capturing the audio signal includes means for performing beamforming to steer an audio beam in a direction associated with the audio signal.

* * * * *